Patented June 7, 1949

2,472,347

UNITED STATES PATENT OFFICE 2,472,347

PREVENTION AND DESTRUCTION OF WEEDS

Wilfred Archibald Sexton, Manchester, England, assignor to Imperial Chemical Industries Limited, a corporation of Great Britain No Drawing. Application August 14, 1945, Serial No. 610,862. In Great Britain October 23, 1942

Section 1, Public Law 690, August 8, 1946
Patent expires October 23, 1962

6 Claims. (Cl. 167—45)

This invention relates to the prevention and destruction of weeds.

In copending British application No. 4598/41 and the corresponding U. S. application Serial No. 613,020, filed August 8, 1946, and issued as U. S. Patent No. 2,453,983 on November 16, 1948, there are described the use for the destruction of weeds of substances which include those conforming to the general formula $Ar.O.CH_2.Y$, in which Ar stands for a phenyl or naphthyl residue which may contain methyl and halogen substituents in addition to the $—O.CH_2.Y$ substituents and Y stands for a carboxy group in which the hydrogen atom may be replaced by a water-soluble salt-forming atom or group.

These substances are soluble in water, or become so when in contact with the soil, but I have found surprisingly that the corresponding insoluble compounds in which Y of the above formula stands for one of the groups $—CONH_2$, $—CN$ or $—COOR$, where R is an aliphatic or cycloaliphatic hydrocarbon residue containing not more than 10 carbon atoms, are also effective against weeds.

The substances are generally effective in quantities of a few pounds per acre and so in order to be able to distribute them effectively, they may be incorporated in larger quantities of non-solvent diluents, which may be inert or which may be substances which can be applied to the soil for other purposes, for example for fertilising or conditioning the soil. A solution of the active agent may be dispersed in the non-solvent diluent, for example by dissolving the agent in a small quantity of a solvent which is insoluble in water, and then mixing this solution with a large quantity of water, with or without emulsifying agents or like adjuvants.

By "non-solvent" I mean, in this specification, a substance which does not dissolve the active agent as do organic liquids such as the lower aliphatic alcohols.

Although exerting a phytocidal action on weeds, the preparations can be applied to ground containing germinating or growing weeds and cereal or other useful crops so as to effectively kill or stunt the weeds without harming the useful crops. The preparations are, however, in general most conveniently applied to the soil before, during or immediately after germination of the weed.

The substances can be used very effectively for the control of charlock in oat crops. When applied to the soil before germination, the growth of charlock can be prevented without harming the oats.

It is already known to spray dilute sulphuric acid on charlock. Sulphuric acid, however, is not only highly corrosive, but it neutralises and renders inactive a corresponding amount of lime or other alkali in the soil.

In one form of the invention water is used as a diluent, the active agents being present in a finely dispersed or emulsified condition. These aqueous preparations may contain wetting and/or emulsifying agents, such as are well known in agriculture and horticulture. With such aqueous dispersions uniform spreading is simple and easy, as mechanical or hand spraying devices may be used. When applying the substances with fertilisers or soil-conditioning agents, the substances are conveniently mixed in such proportions that the soil receives the correct dressing both of weed killing substance and fertiliser, soil-conditioning agent and/or diluent. Inorganic and organic fertilisers and manures may be used, for example ammonium sulphate, basic slag, potash salts, and superphosphates, peat, and hop manure. Hydrated lime, ground lime, and chalk are convenient soil-conditioning agents. Sand, talc, and clay in powder form may be used as solid inert diluents. By an inert solid diluent I mean a substance which is neither a fertiliser nor a soil-conditioning agent and which is without harmful effect on crops.

The invention accordingly includes the use, for the prevention and destruction of weeds, of a compound conforming to the general formula $Ar.O.CH_2.Y$, in which Ar is selected from the group consisting of the phenyl radical, the naphthyl radical, and such radicals containing also at least one substituent selected from the methyl radical and halogen atoms, and Y is selected from the group consisting of the carbonamide, nitrile and carboxylic ester radicals, the carboxylic ester being derived from an alcohol containing not more than 10 carbon atoms. The invention also includes the use of such a compound for killing weeds in a cereal crop. The invention still further consists of compositions comprising such a compound in effective amounts together with a non-solvent therefor. The non-solvent carrier may be a solid diluent such as a fertiliser, a soil-conditioning agent or other inert solid. The carrier may also be an aqueous liquid, the active agent being then dispersed therein.

In addition to including carbonamides and nitriles the invention includes carboxylic esters derived from an alcohol containing not more than 10 carbon atoms, by which I mean compounds containing the group $—COOR$, where R is a lower aliphatic, or cycloaliphatic, hydrocarbon radical, that is, such a radical containing not more than 10 carbon atoms.

Thus the invention includes the use of the amide, nitrile and methyl, ethyl, n-propyl, isopropyl, n-butyl, isobutyl, and cyclohexyl esters of: o-, m-, p-methylphenoxyacetic acid, o-, m-, p-ethylphenoxyacetic acid, o-, m-, p-chlorophenoxyacetic acids, the dimethylphenoxyacetic acids, alpha- and beta-naphthoxyacetic acids and the chloronaphthoxyacetic acids. In particular the invention includes the use of the amide, nitrile, and methyl, ethyl, n-propyl, isopropyl, n-butyl, isobutyl, and cyclohexyl esters of beta-naphthoxyacetic acid, the methyl, n-propyl, isopropyl, and n-butyl esters of 4-chloro-2-methylphenoxyacetic acid and the methyl ester of 3,5-dimethylphenoxyacetic acid.

The following examples illustrate but do not limit the invention, all parts being by weight.

Example 1

100 parts of china clay were intimately mixed with 5 parts of ethyl beta-naphthoxyacetate. The resulting mixture prevented germination or establishment of charlock in a field of oats, without harming the oat crop. It was more effective than sodium beta-naphthoxyacetate.

Example 2

100 parts of talc were intimately mixed with 5 parts of methyl 4-chloro-2-methylphenoxyacetate. The resulting mixture may be used in a similar way to the product of Example 1.

Example 3

25 parts of methyl 3,5-dimethylphenoxyacetate were intimately mixed with 1000 parts of hop manure to give a composition suitable for the control of weeds.

Example 4

30 parts of isopropyl-beta-naphthoxyacetate and 30 parts of cyclohexanone were mixed together. A mixture of 10 parts of the emulsifying agent of Example 1 of British Patent Specification No. 323,720 and 30 parts of water were added. The whole was well mixed and then passed through an homogeniser to give a uniform, fine emulsion. This product was diluted with water and applied as a spray for the control of weeds.

I claim:

1. A composition suitable for destroying weeds comprising an aqueous dispersion of a compound conforming to the general formula $Ar.O.CH_2.Y$, in which Ar is selected from the group consisting of the phenyl radical, the naphthyl radical, and such radicals containing also at least one substituent selected from the methyl radical and halogen atoms, and Y is selected from the group consisting of the carbonamide, nitrile, and carboxylic ester radicals, the carboxylic ester being derived from an alcohol from the group consisting of aliphatic and cycloaliphatic alcohols containing not more than 10 carbon atoms, the compound being present in an amount sufficient to exert an herbicidal action.

2. A dry pulverulent composition for selectively killing weeds comprising a divided, inert solid and a compound conforming to the general formula $Ar.O.CH_2.Y$, in which Ar is selected from the group consisting of the phenyl radical, the naphthyl radical, and such radicals containing also at least one substituent selected from the methyl radical and halogen atoms, and Y is selected from the group consisting of the carbonamide, nitrile, and carboxylic ester radicals, the carboxylic ester being derived from an alcohol from the group consisting of aliphatic and cycloaliphatic alcohols containing not more than 10 carbon atoms, the compound being present in an amount sufficient to effect an herbicidal action.

3. A composition suitable for the prevention and destruction of weeds containing as an active ingredient a lower alkyl ester of 4-chloro-2-methyl-phenoxyacetic acid, in amount sufficient to effect an herbicidal action.

4. A composition for destroying weeds comprising an aqueous dispersion of a lower alkyl ester of 4-chloro-2-methyl-phenoxyacetic acid, the compound being present in an amount sufficient to exert an herbicidal action.

5. A dry pulverulent composition for selectively killing weeds comprising a divided, inert solid and a lower alkyl ester of 4-chloro-2-methyl-phenoxyacetic acid, the compound being present in an amount sufficient to effect an herbicidal action.

6. A composition for destroying weeds comprising a dispersion in a non-solvent diluent of a lower alkyl ester of 4-chloro-2-methyl phenoxyacetic acid, the compound being present in an amount sufficient to exert an herbicidal action.

WILFRED ARCHIBALD SEXTON.

REFERENCES CITED

The following references are of record in the file of this patent:

UNITED STATES PATENTS

| Number | Name | Date |
|---|---|---|
| 2,322,761 | Lontz | June 29, 1943 |
| 2,390,941 | Jones | Dec. 11, 1945 |
| 2,396,513 | Jones | Mar. 12, 1946 |
| 2,412,510 | Jones | Dec. 10, 1946 |

OTHER REFERENCES

J. für praktische Chemie, vol. 20 (2nd series), pages 275 and 276 (1879). (Copy in P. O. S. L.)